United States Patent [19]

Hunger et al.

[11] 3,974,136

[45] Aug. 10, 1976

[54] MODIFIED FORM OF A DISAZO PIGMENT

[75] Inventors: Klaus Hunger, Kelkheim, Taunus; Joachim Ribka, Offenbach, Main; Wolfgang Rieper, Frankfurt am Main, all of Germany

[73] Assignee: Hoechst Aktiengesellschaft, Frankfurt am Main, Germany

[22] Filed: Jan. 17, 1974

[21] Appl. No.: 434,039

[30] Foreign Application Priority Data

Jan. 19, 1973 Germany.............................. 2302509

[52] U.S. Cl................................ 260/176; 260/208; 106/288 Q
[51] Int. Cl.²......................................... C09B 43/00
[58] Field of Search.......................... 260/176, 208; 106/288 Q

[56] References Cited
UNITED STATES PATENTS

| | | | |
|---|---|---|---|
| 3,169,955 | 2/1965 | Siebert et al......................... | 260/176 |
| 3,711,461 | 1/1973 | Pretzer et al. .................. | 260/208 X |

FOREIGN PATENTS OR APPLICATIONS

| | | | |
|---|---|---|---|
| 1,179,908 | 10/1964 | Germany............................ | 260/208 |
| 775,355 | 5/1957 | United Kingdom................. | 260/176 |

*Primary Examiner*—Charles F. Warren
*Attorney, Agent, or Firm*—Curtis, Morris & Safford

[57] ABSTRACT

The disazo pigment of the formula

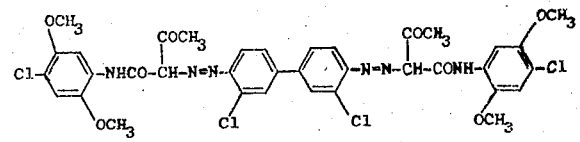

characterized by a specific surface of 12 – 20, preferably 13 – 18 m²/g, a maximum of the distribution of the grain sizes of between 500 and 1000 nm and a proportion of these grain sizes in the total distribution of between 35 and 65 %. This disazo pigment is obtained by isolating the pigment, after coupling, by stirring it out with alkali and, after having filtered it and washed it to neutrality, heating it to temperatures above 100° C in a mixture of water and a solvent which is immiscible with water or miscible with water to a limited degree only.

1 Claim, No Drawings

MODIFIED FORM OF A DISAZO PIGMENT

The present invention relates to a disazo pigment, to its preparation and to its use.

German Patent No. 1,179,908 (Examples 3 and 7) describes the after-treatment of the pigment of the formula

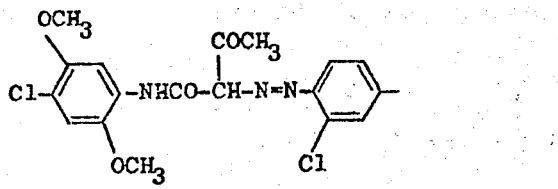

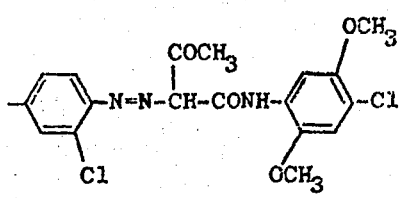

by heating it in o-dichlorobenzene or tetrahydronaphthalene to temperatures below 100° C. The pigment so after-treated has a specific surface of about 35 m²/g and a maximum of the distribution of the grain size between 100 and 250 nm. In the range of between 500 and 1000 nm, the proportion of grains of this size is less than 20 %.

The pigment so obtained is very transparent and is therefore suitable for use in printing pastes. Owing to its high absorption of binder, which is due to the high proportion of fine grains, this pigment cannot be used in lacquers for full tone lacquerings. The high binder absorption permits pigment concentrations of at most 5 % in the lacquer. Higher concentrations yield highly viscous pastes of poor fluidity, which can hardly be worked and which yield stove lacquerings without surface luster.

Now, we have found a highly covering disazo pigment of the chemical constitution

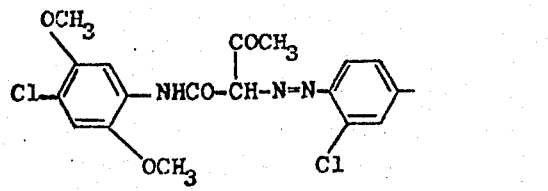

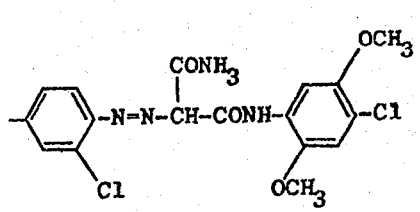

which is characterized by a specific surface of 12 – 20, preferably 13 – 18, m²/g, a maximum in the distribution of the grain size of between 500 and 1000 nm and a proportion of these grain sizes in the total distribution of between 35 and 65 %, preferably 45 and 60 %.

This new pigment form is obtained by isolating the pigment, after coupling, by stirring it with alkali and, after having filtered it off and washed it until neutral, heating it with an organic solvent which is immiscible with water or miscible with water to a limited degree only, to temperatures above 100° C. The isolation by stirring with the aid of alkali is effected by rendering alkaline the suspension of pigment, such as it is obtained after the usual coupling reaction, and stirring it for about 1 hour at an elevated temperature. The pigment is then filtered off and washed neutral. The wet press cake so obtained or the dry pigment is then suspended in a mixture of water and an organic solvent which is immiscible with water or miscible with water to a limited degree only. The content of pigment in this suspension is in the range of from about 2 to 10, preferably 4 to 7, % by weight. The proportion of organic solvent in the total quantity of liquid is in the range of between 10 and 100 % by weight. A mixture consisting of about equal parts of water and organic solvent is preferred.

This suspension is heated for some time to temperatures above 100° C, preferably to temperatures in the range of from 120° to 180° C. The length of time of this heat treatment depends on the temperature chosen and on the organic solvent. The higher the temperature and the more solvent is used, the shorter is the time required. In general, the treatment times are between about 10 minutes and 8 hours. The reaction conditions required for obtaining optimum covering power can be determined, for example by preliminary tests on a reduced scale.

As organic solvents which are not miscible with water or which are not miscible with water to an illimited degree, there may be used in particular chlorobenzene and other halogenated aromatic compounds, for example o-dichlorobenzene, or higher alcohols of 4 to 8 carbon atoms, for example isobutanol, aromatic nitrocompounds such as nitrobenzene, aromatic amines such as aniline, aromatic ethers such as anisole or phenetol, esters of aromatic acids such as benzoic acid methyl ester or ethyl ester, and ketones such as methyl-isobutyl ketone or methyl-isopropyl ketone. The term "not miscible with water to an illimited degree" refers to those solvents of which 20 g at most are miscible with 100 g of water.

Isolation of the pigment so treated is preferably carried out by filtration from the aqueous suspension, after having distilled off the organic solvent with the aid of steam.

The distribution of the particle size was determined according to the method described by C. E. Marshall in "Proceedings of the Royal Society", London A126, page 427 (1936). The specific surface was measured according to the method described by R. Haul, G. Dumbgen in Chem. Ing. Techn. Vol. 35, page 586 (1963).

The new pigment form is especially suited for the dyeing of stoving lacquers, plastics and special printing pastes, for example for the printing of sheet metal. The materials dyed with this pigment form show an essentially improved covering power and a distinctly increased fastness to light compared to dyeings produced with the pigment form obtained according to the methods described in Examples 3 and 7 of German Patent No. 1,179,908. Stoving lacquerings produced with this new pigment form show an excellent luster and good fluidity behaviour even in highly pigmented form.

The following Examples illustrate the invention

EXAMPLE 1

An aqueous suspension of the coupling product of 3,3'-dichlorobenzidine and 2 equivalents of 1-acetoacetylamino-4-chloro-2,5-dimethoxy-benzene was rendered alkaline with sodium hydroxide solution and heated for 1 hour to about 50° C and then the pigment was filtered off and washed until neutrality. 200 g of the about 20% dyestuff paste were suspended in 250 ml of water and, after the addition of 400 ml of chlorobenzene, the suspension was heated for 1 hour in a closed vessel to 120° C. After cooling to 90° C, the chlorobenzene was distilled off by the introduction of steam and the pigment was filtered off from the remaining aqueous suspension. The dried and ground dyestuff had a specific surface of 17.8 m$^2$/g. 47 % of all pigment particles had an average diameter of between 500 and 1000 nm. When 5 – 8 % by weight of this pigment were incorporated into an alkyd - melamine resin clear lacquer in a paint shaker and then coated on test cards on a black and white ground and these cards were stoved for 30 minutes at 140° C, lacquerings were obtained which had a very high covering power, faultless flow and high luster. The lacquerings were distinguished by an excellent fastness to light and good fastness to over-lacquering.

EXAMPLE 2

200 g of the about 20% aqueous pigment paste obtained according to Example 1 were suspended in 250 ml of water and, after addition of 450 ml of isobutanol and 2 g of sodium sulfite, heated for 8 hours in a closed vessel to 150° C. After cooling to 80° C, the isobutanol was distilled off with steam and the pigment was isolated from the remaining aqueous suspension. A product was obtained which showed a similarly high covering power and good properties when applied as the pigment described in Example 1.

We claim:

1. A disazo pigment of the formula

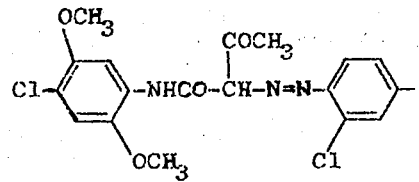

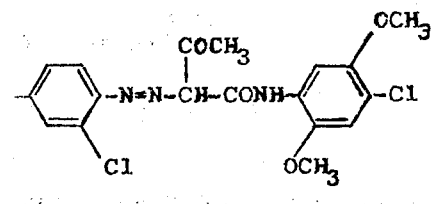

characterized by a specific surface of 12 – 20 m$^2$/g, a maximum of the grain size distribution of between 500 and 1000 nm and a proportion of these grain sizes in the total distribution of between 35 and 65 %.

* * * * *